United States Patent [19]

Sabatiuk

[11] Patent Number: 4,693,075

[45] Date of Patent: Sep. 15, 1987

[54] GAS TURBINE ENGINES EMPLOYING FIXED VOLUME COMBUSTION

[76] Inventor: Andrew Sabatiuk, 336 W. 31st St., Miami Beach, Fla. 33140

[21] Appl. No.: 884,862

[22] Filed: Jul. 16, 1986

Related U.S. Application Data

[63] Continuation of Ser. No. 666,773, Oct. 31, 1984, abandoned.

[51] Int. Cl.[4] ............................................... F02C 5/00
[52] U.S. Cl. .................................. 60/39.39; 60/39.43; 60/39.76
[58] Field of Search ............... 60/39.38, 39.39, 39.4, 60/39.43, 39.76, 39.78; 415/77, 79

[56] References Cited

U.S. PATENT DOCUMENTS

| | | | |
|---|---|---|---|
| 1,077,314 | 11/1913 | Stern | 60/39.38 |
| 1,395,995 | 11/1921 | George | 60/39.39 |
| 2,659,198 | 11/1953 | Cook | 60/39.39 |
| 2,928,239 | 3/1960 | Goldstein | 60/39.39 |
| 3,756,019 | 9/1973 | Holzapfel et al. | 60/39.43 |

FOREIGN PATENT DOCUMENTS

| | | | |
|---|---|---|---|
| 1131310 | 10/1956 | France | 60/39.38 |
| 656337 | 8/1951 | United Kingdom | 60/39.39 |

OTHER PUBLICATIONS

Hill et al., *Mechanics and Thermodynamics of Propulsion*, Addison-Wesley Co., Reading, Mass., p. 147.

*Primary Examiner*—Louis J. Casaregola
*Attorney, Agent, or Firm*—Edmund S. Lee, III

[57] ABSTRACT

A gas turbine engine includes a rotor forming an inducer and a turbine which succesively register with a series of circumferentially spaced combustion chambers. The engine has the capability of firing less than the total number of combustion chambers for each cycle of rotor rotation.

14 Claims, 17 Drawing Figures

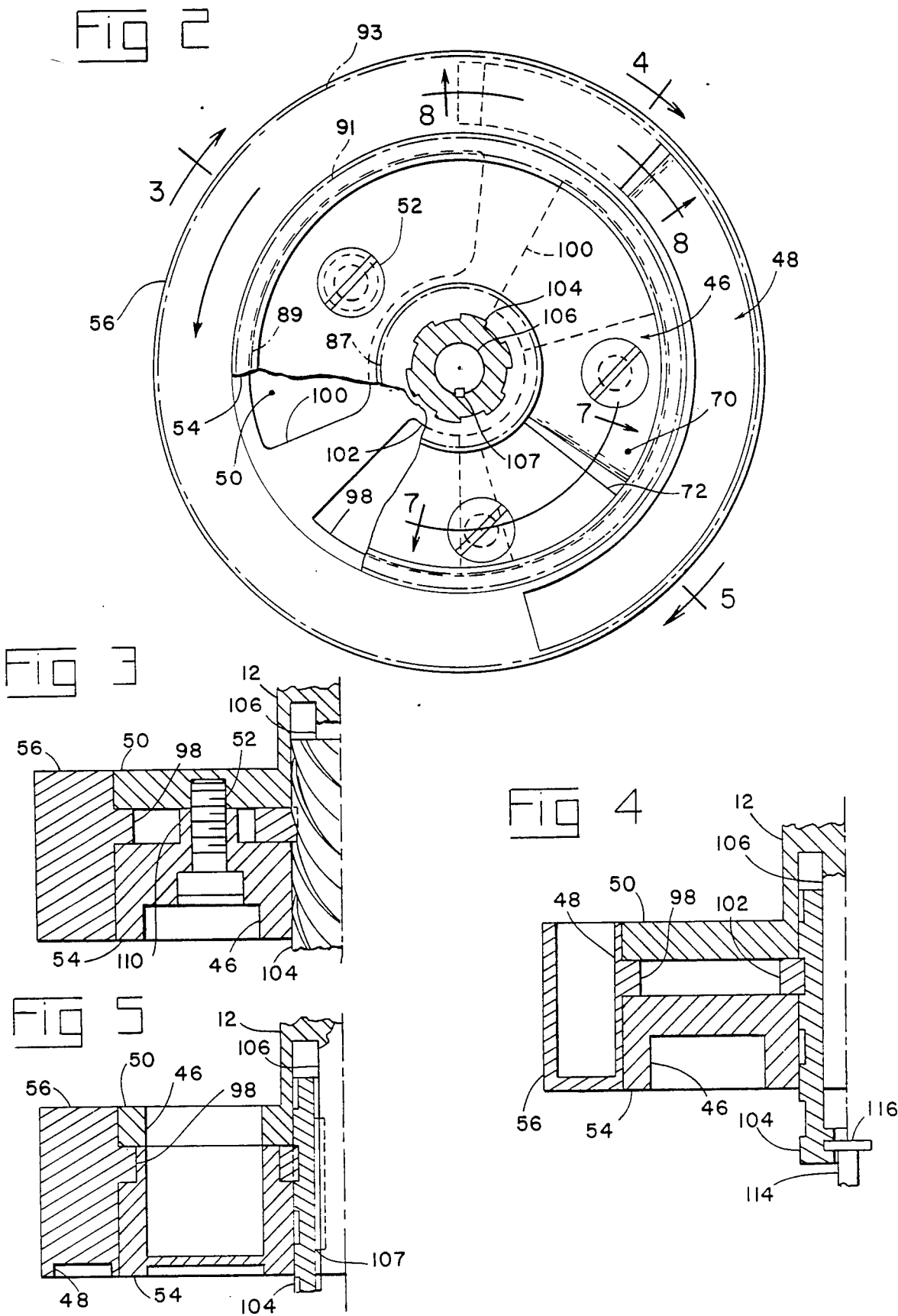

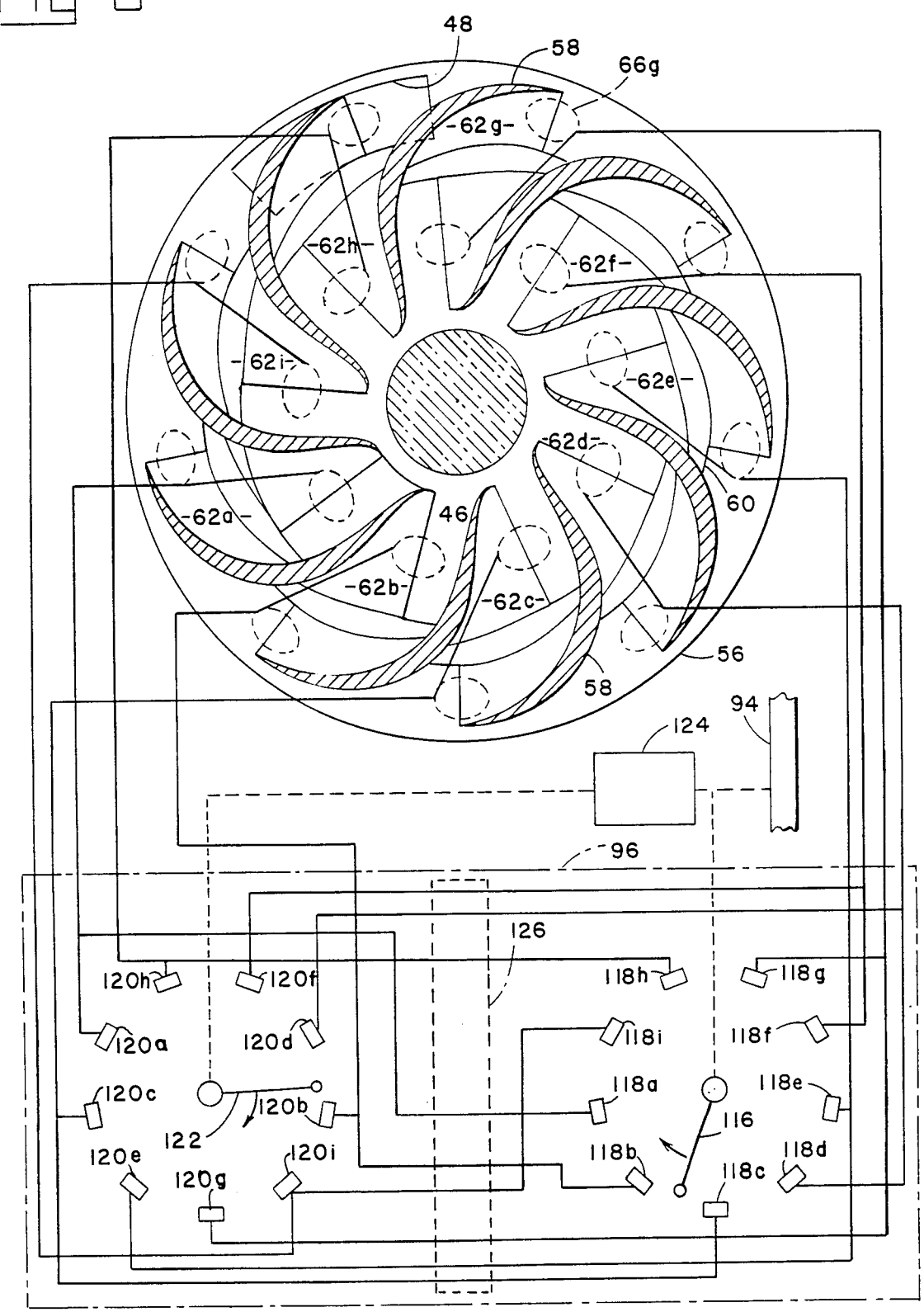

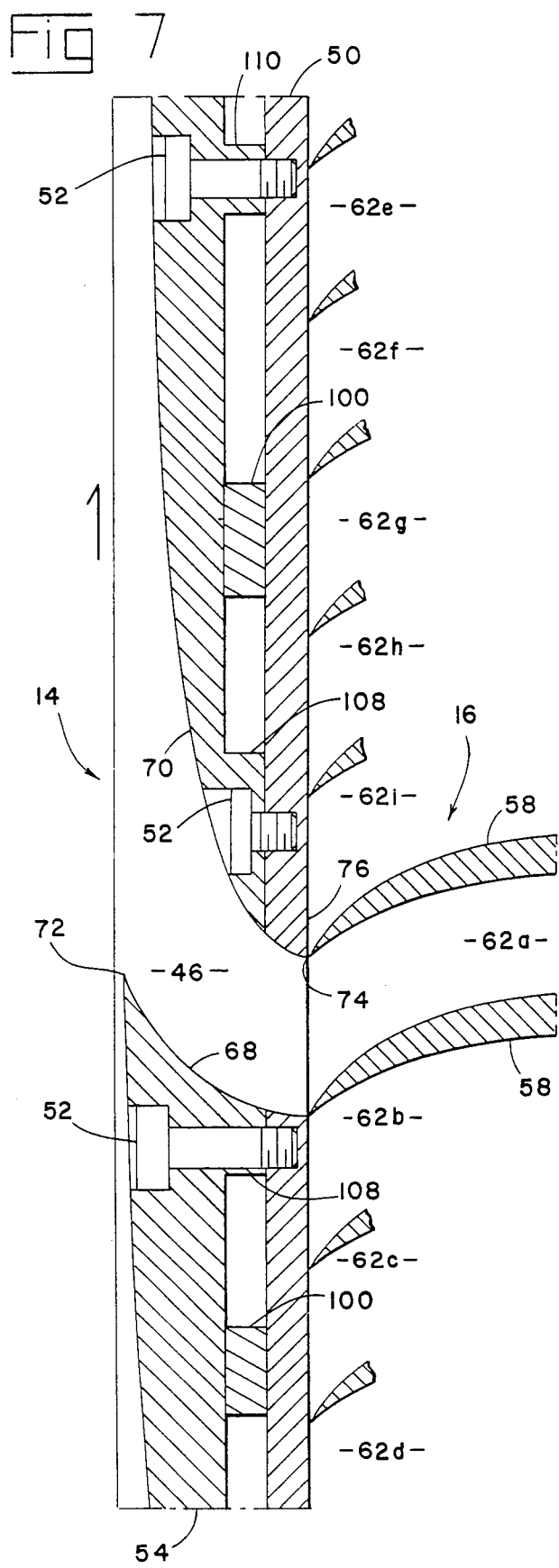
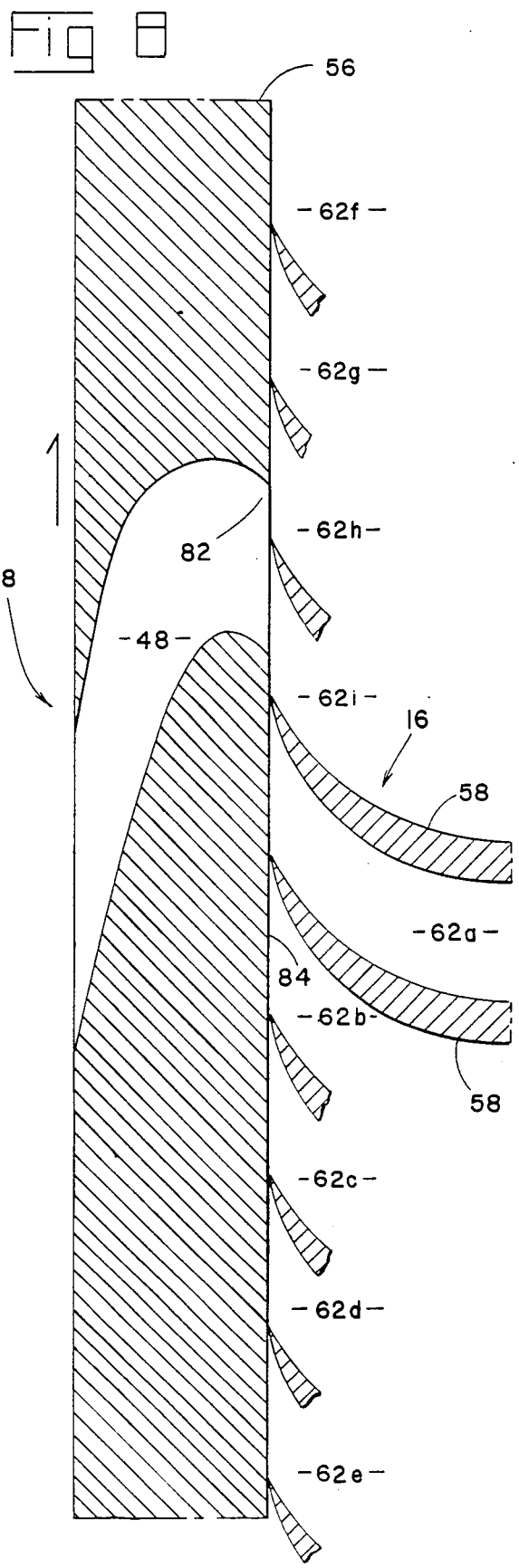

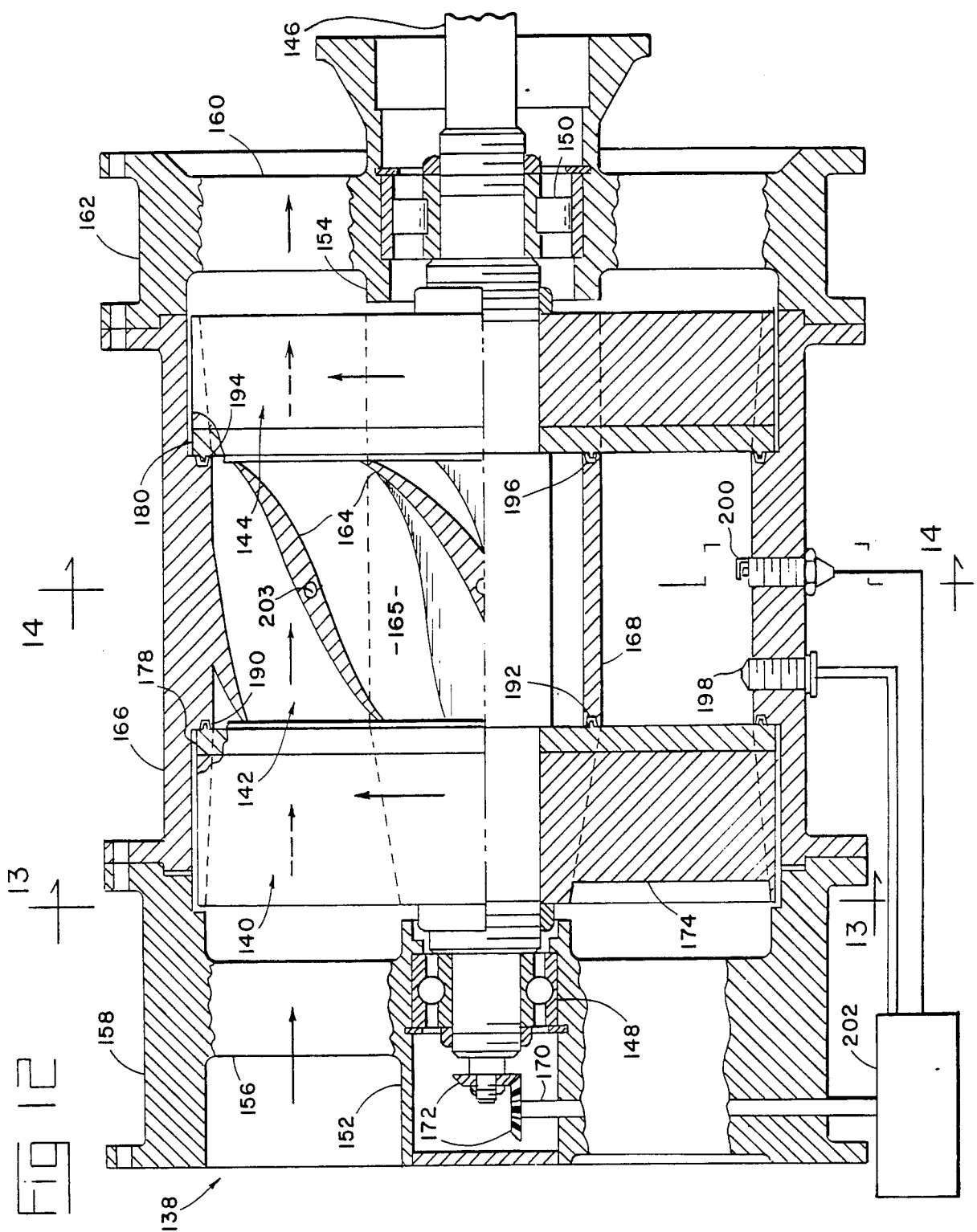

GAS TURBINE ENGINES EMPLOYING FIXED VOLUME COMBUSTION

This case is a continuation of application Ser. No. 666,773 filed 10/31/84, now abandoned.

The present invention relates to improvements in gas turbine engines, and more particularly to improvements in gas turbine engines employing a fixed volume combustion cycle.

In comparison with piston engines, gas turbine engines offer significant advantages in simplicity and vibration free operation, with, comparably, minimal maintenance requirements. Notwithstanding these well recognized advantages, gas turbine engines have found commercial acceptance in but a limited portion of the wide range of applications requiring a power shaft output.

Gas turbine engines inherently generate a hot gas stream. This characteristic provides the ability to generate a propulsive force, by discharging the hot gas stream through a propulsion nozzle. Thus, the primary field of use of gas turbine engines has been in the propulsion of aircraft, and such engines are now used almost exclusively as power plants for large aircraft and to a lesser, but still significant extent in the propulsion of smaller aircraft.

Gas turbine engines have also found some measure of commercial acceptance in electrical power generation, where the energy of the hot gas stream is converted to a shaft power output for driving generators. This is an application which has, in common with aircraft propulsion, a similar operating cycle. Both require long periods of steady state operation at constant power settings.

In distinction to such operating cycles, there is a much broader field of engine application which requires constantly changing power requirements varying, randomly, from zero to maximum, with relatively short periods of steady state operation. Exemplary of this are automobiles and other vehicles, as well as smaller devices, such as lawn motors, chain saws, snow mobiles and the like which are powered by one or two piston engines, which are mass-produced and well standardized in design, often times with pull rope starters.

It is a broad object of the present invention to provide a gas turbine engine capable of operating efficiently under constantly changing, widely varying load conditions thereby making available the advantages of gas turbine engines in applications now dominated by reciprocating, piston engines.

Gas turbine engines, as they have been developed, with their great emphasis on aircraft propulsion, are predicated on a constant pressure, constant flow combustion cycle in the generation of the hot gas stream. In order to obtain efficiency, such combustion cycles are also predicated on employing a compressor which pressurizes air to a relatively high pressure level to increase the energy of the hot gas stream generated. Inherent in this cycle is that a significant portion of the energy generated is extracted to power the compressor.

High overall efficiencies can be and are obtained with constant pressure combustion. However, the high pressure levels, limit minimum operating speeds and power outputs to a relatively large percentage of maximum values. That is, the power output range is relatively small. Also, efficiency falls sharply at reduced levels, all of which mitigate against use of such engines for other than applications where the power loading is relatively constant.

A related problem is the power requirements for engine starting. To obtain the necessary pressure rise in the compressor, a very significant torque is needed. Thus for combustor light conditions, the engine rotor must be driven, by an outside power source to as much as 40% of rated, or 100%, engine speed. For some of the larger, more sophisticated, aircraft engines, a 200 horsepower electric motor is required to achieve light off conditions.

An alternative to the constant pressure combustion cycle is the constant volume cycle. This alternative has been recognized since the earliest days of gas turbine engine development. It involves generation of a hot gas stream by controlled, successive explosions. As early as 1913, in U.S. Pat. No. 1,077,314, it was recognized that the constant volume combustion cycle engine could be started with very low power input—there it is proposed that the use of a simple hand crank is suitable.

Despite the recognition of starting ease and other teachings of the potential advantages of the constant volume cycle engine found sporadically in the patent literature over the subsequent years, constant volume combustion cycle gas turbine engines have fould little or no commercial acceptance. Thus the potential advantages of employing gas turbine engines in the fields dominated by internal combustion, piston engines, as above discussed, remains unfulfilled.

Accordingly, the present invention has, as its further object, to improve constant volume combustion cycle engines, to the end that the potential advantages of gas turbine engines may be more widely utilized as power plants in the such piston engine fields of domination as automobiles, lawnmowers, snowmobiles and the like.

These ends are broadly attained by a gas turbine engine comprising, in series flow relation, an inducer, a combustor and a turbine. The combustor has a plurality of circumferentially spaced chambers. The inducer has a passageway terminating in a discharge port, which opens onto a circumferential surface in sealing relation with the entrances to the combustor chambers. The turbine has an expansion passageway extending from a circumferential surface which is in sealing relation with the combustion chamber exits. The inducer discharge port and the turbine inlet ports are successively registerable with the entrances and exits of different combustion chambers, as the inducer and turbine rotate and as, at least one chamber is sealed at both ends. Operating means introduce fuel into successive chambers and then ignite the fuel when both ends are sealed.

Preferably the inducer passageway is configured to charge air into the combustion chambers, without substantially increasing its velocity or pressure level.

An advantageous embodiment of the engine provides reverse flow of the gas stream. Thus the axial flow from the inducer is turned radially outward and then in the opposite axial direction for axial flow through the turbine. This configuration attains another object of the invention, which is to minimized pressure losses and commensurate efficiency losses in engine operation.

A further feature of the invention is found in the provision of means for varying the angular relation between the inducer discharge port and the turbine inlet port. This feature minimizes losses by permitting a chamber in which an explosion has been created, to be released to the turbine inlet port when the maximum energy of combustion has been developed.

Another feature is found in the provision of means for firing alternate chambers, where an odd number of chambers are provided for the combustor. This enhances efficiency when operating at reduced power settings.

Another feature of the invention is found in the provision of a free turbine for driving the engine's output shaft and also to drive a compressor for supercharging the air fed by the inducer to the combustor chambers.

The above and other related objects and features of the invention will be apparent from a reading of the following disclosure, with reference to the accompanying drawings, and the novelty thereof pointed out in the appended claims.

In the drawings:

FIG. 2 is a view of the engine's rotor taken on line 2—2 in FIG. 1;

FIG. 3 is a radial section taken on radius 3 in FIG. 2;

FIG. 4 is a radial section taken on radius 4 in FIG. 2;

FIG. 5 is a radial section taken on radius 5 in FIG. 2;

FIG. 6 is a section taken generally on line 6—6 in FIG. 1, schematically showing a portion of the engine operating means;

FIG. 7 is radial development, taken generally on line 7—7 in FIG. 2, illustrating flow through the inducer portion of the present engine;

FIG. 8 is a radial development, taken generally on line 8—8 in FIG. 2, illustrating flow through the turbine portion of the present engine;

FIG. 12 is a longitudinal, axial section of an another embodiment of the invention;

Figure 1:
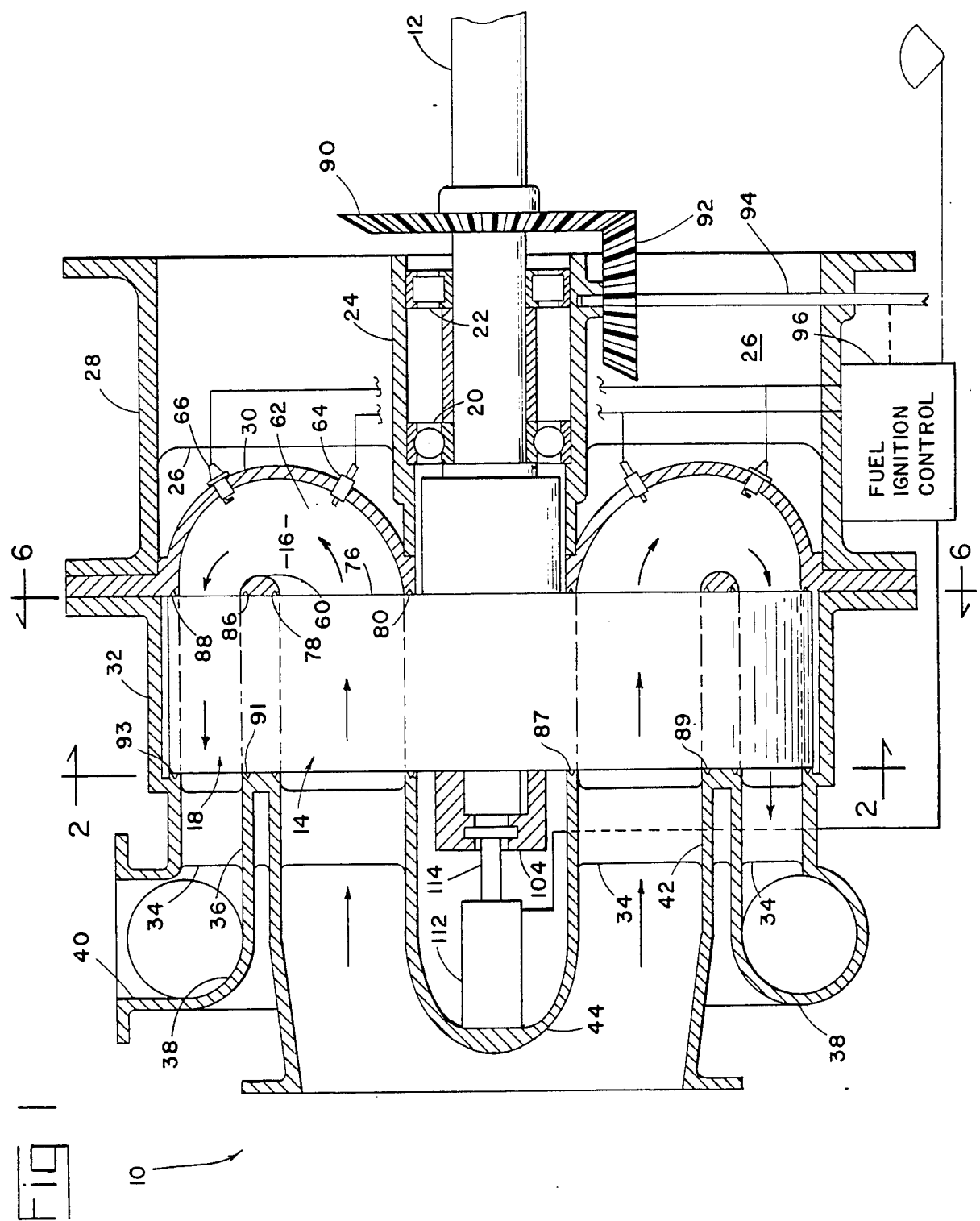
FIG. 1 is a longitudinal section of a gas turbine engine embodying the present invention.

Referencing FIG. 1, the present engine, indicated generally by reference character 10, has a power output shaft 12, which may be connected to any suitable load, such as the drive train of an automobile, lawn mower blade, or the like.

An inducer 14, combustor 16 and turbine 18 are provided in series flow relationship to drive the output shaft 12.

The shaft 12 is journaled by a ball bearing 20 and roller bearing 22 in a central hub 24, which is connected by struts 26 to a casing 28. The outer, hemi-toroidal wall 30 of the combustor 16 is defined by a housing having a flanged connection to the casing 28. A second casing 32 is also joined at this flanged connection.

A series of integral struts 34 extend inwardly from the casing 32 to support an inner casing 36, Casings 32 and 36 define the annular discharge flow path from the turbine. This discharge flows to a toroidal collector 38 for ultimate flow from the engine through a vertically disposed discharge conduit 40.

The struts 34 continue inwardly to support a casing 42, which defines the outer bounds of the air inlet to the engine, and then a central nose cone 44, which defines the inner bounds of air inlet flow.

The inducer 14 and turbine 18 are radially aligned, respectively comprising an inducer passage 46 (FIG. 2) and turbine expansion passage 48, better illustrate in the flow cascade drawings of FIGS. 7 and 8.

These flow passages are formed in a composite rotor (FIGS. 2-5) comprising a disc 50, integral with the shaft 12 (see FIGS. 2-5). Screws 52 connect a second disc 54 to the disc 50. The inducer passage 46 is then formed in the discs 50, 54. The turbine passage is formed in a ring 56 which is mounted on the outer peripheries of the discs 50, 54.

The combustor 16 comprises a plurality of vanes 58 (FIGS. 1 and 6) which are formed integrally with the outer combustor wall 30 and support an inner sealing ring 60 which separates inducer flow from turbine flow along the radial face of the composite disc. Each pair of vanes 58 defines a discrete combustion chamber 62. A fuel injector 64 and a spark plug 66 are provided for each chamber 62.

Referencing again the inducer 14 FIG. 7), the passage 46 is defined by a pressure surface 68 and a suction surface 70 which curve from a lip 72 on the inlet side of the inducer. Both surfaces have downstream portions which curve towards an axial direction and define the radial, trailing and leading edges of the inducer discharge port 74. This preferred configuration of the inducer passageway, which curves, or spirals along its suction surface for approximately 360 degrees, adds but a minimal increment of energy to the gas stream to be generated by the engine.

Circumferentially of the discharge port 74 is a surface 76 which is disposed in a plane normal to the axis of rotation and in sealing relation with the upstream ends of the vanes 58. Labyrinth seals 78, 80 then seal the inner and outer bounds of the the inducer passageway 46 and the chambers 62. Similarly, the turbine expansion passageway extends from an inlet port 82 opening from a surface 84 which is coplanar with the surface 76 and in sealing relation with the downstream ends of the vanes 58. Labyrinth seals 86, 88 then seal the inner and outer bounds of the inlet port and the combustor chambers 62.

The inducer inlet and turbine discharge are also coplanar, FIG. 1. Labyrinth seals 87, 89 are provided at the inner and outer bounds of the air inlet flow and similar seals 91, 93 are provided for the inner and outer bounds of the turbine direction.

In operation, rotation is in a counterclockwise direction, as seen in FIG. 2. Air is fed by the inducer passage 46 to successively charge air into the combustion chambers 62, chamber 62a is shown as the current chamber being charged (FIGS. 6-8). The discharge port 74 of the inducer passage is of the same outline as the entrances to the several chambers 62. The turbine passage inlet port 82 has an outline matching the outlines of exits of the combustor chambers.

Thus chambers 62b, 62c, 62d, 62e, 62f and 62g have previously been charged with air and are sealed at their opposite ends. As each chamber is sealed, fuel is introduced into that chamber through the injector 64 for that chamber. As illustrated in FIGS. 7 and 8, chamber 62b would be the next chamber into which fuel would be introduced. After introduction of fuel, a mixing time occurs to create a combustible mixture, which, in effect, is an explosive atmosphere. This atmosphere is then ignited, by firing the spark plug 66 for the chamber when am explosive atmosphere is created.

A finite time is required for the charging, ignition and combustion process, culminating in the generation of high energy gas charge in the combustion chambers. Ideally, when this charge reaches its maximum energy level, it will be discharged into the turbine passage entrance port for maximum efficiency in converting the energy to shaft power output. This is illustrated in FIGS. 7 and 8. Expansion of the combustion gasses from chamber 62h is in its initial stages, while discharge and scavenging of the combustion gasses from chamber 62i is well along.

Figure 9:
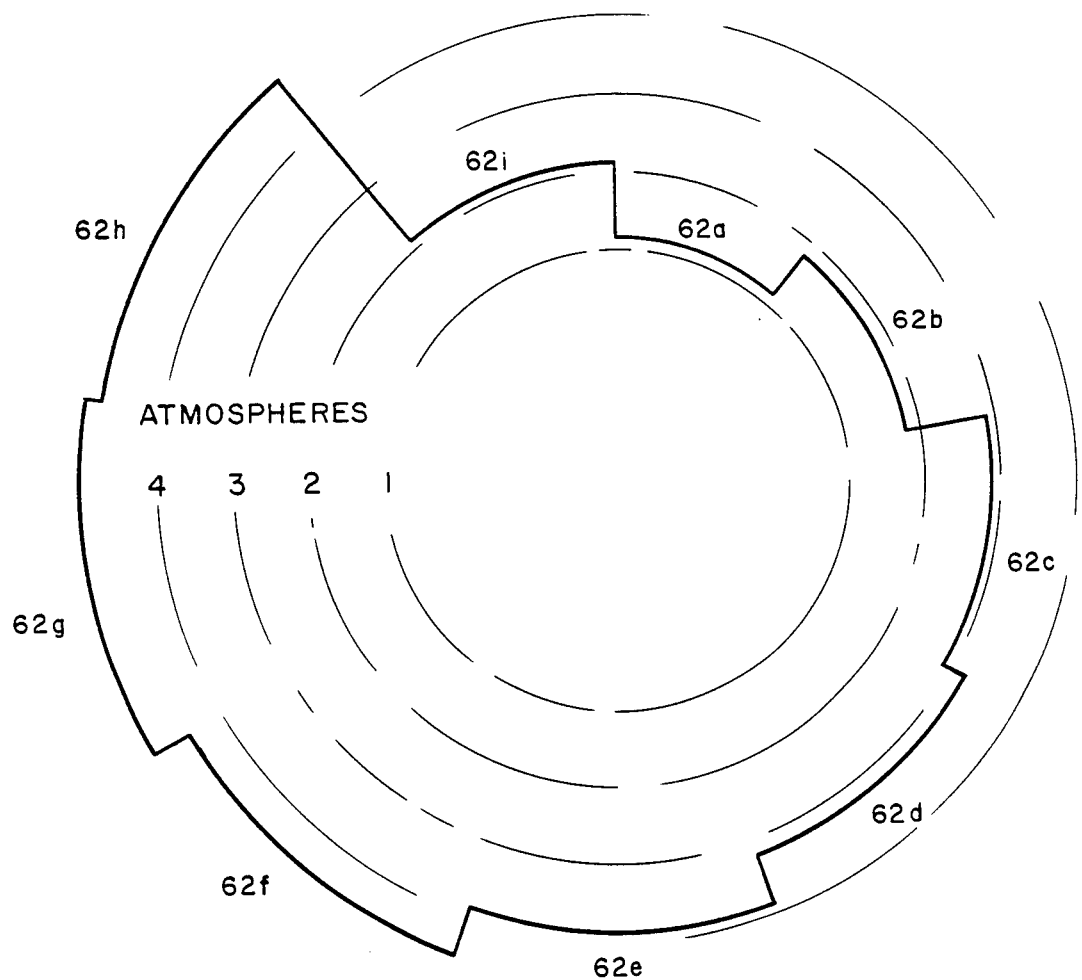
FIG. 9 is a plot of the instantaneous pressures developed in the several combustion chambers of the present engine.

FIG. 9 further illustrates the charging, combustion and exhaustion of the gas charge cycle, as reflected by chamber pressure.

The engine operating means comprise state of the art components for sequentially introducing fuel into the chambers 62 and then firing the spark plugs 66. Referencing FIG. 1, it will be seen that a bevel gear 90 is mounted on the output shaft 12 and meshes with a second bevel 92 to drive an accessories shaft 94, which is journaled on the hub 24 and the casing 28. A fuel/ignition control may be mounted on the casing 28 and mechanically driven from the accessories drive shaft 80 to properly time the flow of fuel to the injectors 64 and energization of the spark plugs 66.

The description, thus far, has contemplated steady state operation at a full power setting or output. To provide efficient operation at other than such a steady state operating condition, means are provided for varying the angular relation between the inducer discharge port 74 and the turbine inlet port 82. These means, now to be described, provide for a fine tuning of this relationship so that the turbine inlet port 82 will be brought into registration with the combustion chamber outlets at the peak of the energy generated by the explosion of fuel, avoiding energy loss by premature discharge and incomplete combustion, or by leakage due to the energy peak being reached for a substantial period of time before delivery to the turbine.

Reverting to FIGS. 2-5, the composite construction of the inducer/turbine rotor will be further described. The ring 56 has an inwardly extending flange 98 which is captured between the discs 50, 54, to provide for relative rotation between the discs and the ring. A pair of struts 100 extend inwardly to a hub 102 which has an internal, spiral spline engaging a correspondingly splined sleeve 104, which is received by a bore in the end of the output shaft 12. The sleeve 104 is slidable on a central, spur shaft 106 projecting from the output shaft 12, and held against rotation by a key 107. It will be seen that the disc 54 is spaced from the disc 50 by projections 108 on opposite sides of the discharge port 74 and by a boss 110 between the struts 100, see also FIG. 7. Thus approximately 60 degrees of relative movement between the discs 50, 54 and the ring 56 is available.

To accomplish this adjustment, an actuator 112 (FIG. 1) is mounted in the nose cone 44. Its plunger 114 is provided with a disc 116 which is captured by a groove in the end of the sleeve 88. Axial movement of the plunger shifts the sleeve 104 and rotates the ring 56 to obtain the desired angular position between the ports 74 and 82. Pressurized hydraulic lines may extend through one of the struts 34 to the fuel/ignition control. Inputs to this control may then be employed to energize the actuator in optimizing the expansion of combustion gasses from the combustor chambers as a function of throttle input, or as a separately generated input.

As noted, the described means for adjusting the angular relation between the inducer discharge port 74 and the turbine inlet port 82 is in the nature of fine tuning. A further feature relating to cycle efficiency is in the provision of means for firing alternate, successive combustor chambers, as opposed to firing each of the combustion chambers successively. Alternate firing provides several advantages. It greatly extends the efficiency of operation over a wide range of power settings, or outputs, as well as permitting operation of the combustor components at reduced temperature levels, thus extending operating life.

These operating means are schematically shown in FIG. 6. The fuel/ignition control 96 is there shown in greater detail. An actuator arm 116 is driven from the accessories drive shaft 96 in one to one relation with rotation of the shaft 12. The arm 116 is arranged to successively actuate controls 118a, 118b, etc. The controls 118 are connected by fuel and electrical lines to the injectors 64 and spark plugs 66 in the respective chambers 62a, 62b, etc. Upon actuation, each control discharges a metered amount of fuel to its injector and then actuates its associated spark plug in proper timed sequence, the firing sequence, as illustrated, being 118b, 118a, 118i, 118h, 118g, 118f, 118e, 118d, 118c, in accordance with the previous description.

To obtain alternate firing of the combustor chambers, a second set of controls 120 is provided. These controls are actuated by an arm 122. This arm is also driven from the accessories drive shaft 94, but through a gear reducer 124, so that it rotates at one half the speed of the shaft 12. A switching device 126 is provided to selectively control firing of the combustor chambers by the controls 118 or 120. When this switch deactuates the controls 118 and actuates the controls 120, the firing sequence becomes 120b, 120i, 120g, 120e, 120c, 120a, 120h, 120f, 120d.

It will be appreciated that an odd number of chamber 62 is required to obtained the described firing of alternate, successive chambers. Three is the theoretical minimum, but it has been determined that five chambers is the mimimum acceptable for efficient operation.

It will be appreciated that the means for adjusting the angular relation between the inducer and turbine can be advantageously employed when employing the alternate firing sequence mode, as well as with the full power mode where each successive chamber is fired.

Figure 10:
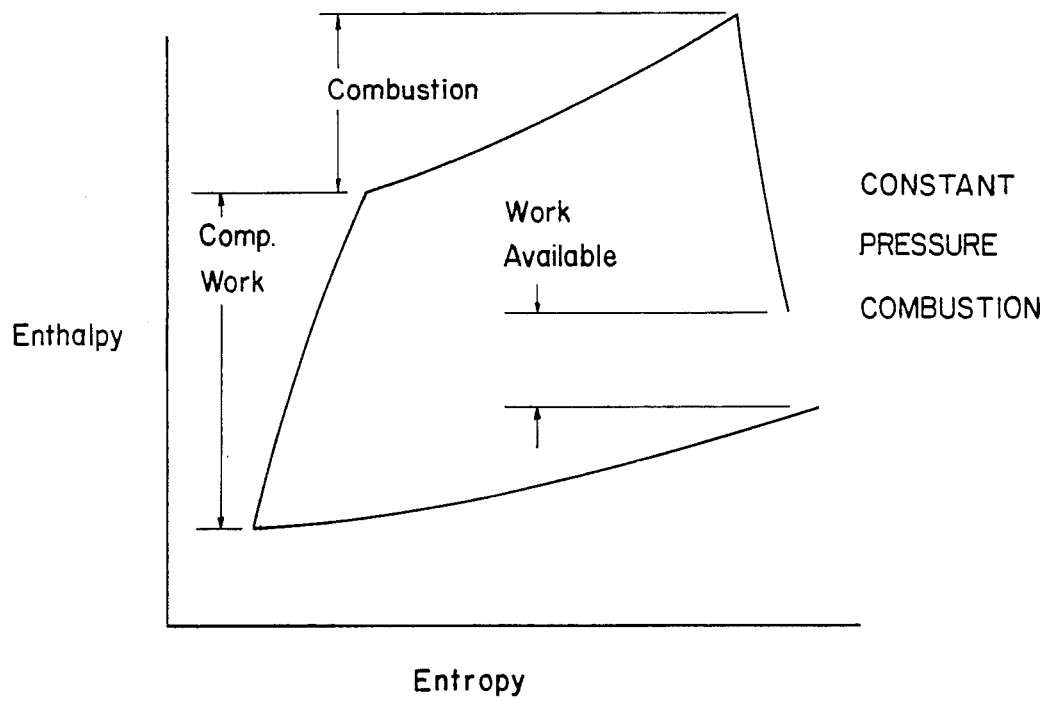
FIG. 10 is an enthalpy/entropy plot of a constant pressure combustion cycle engine.
Figure 11:
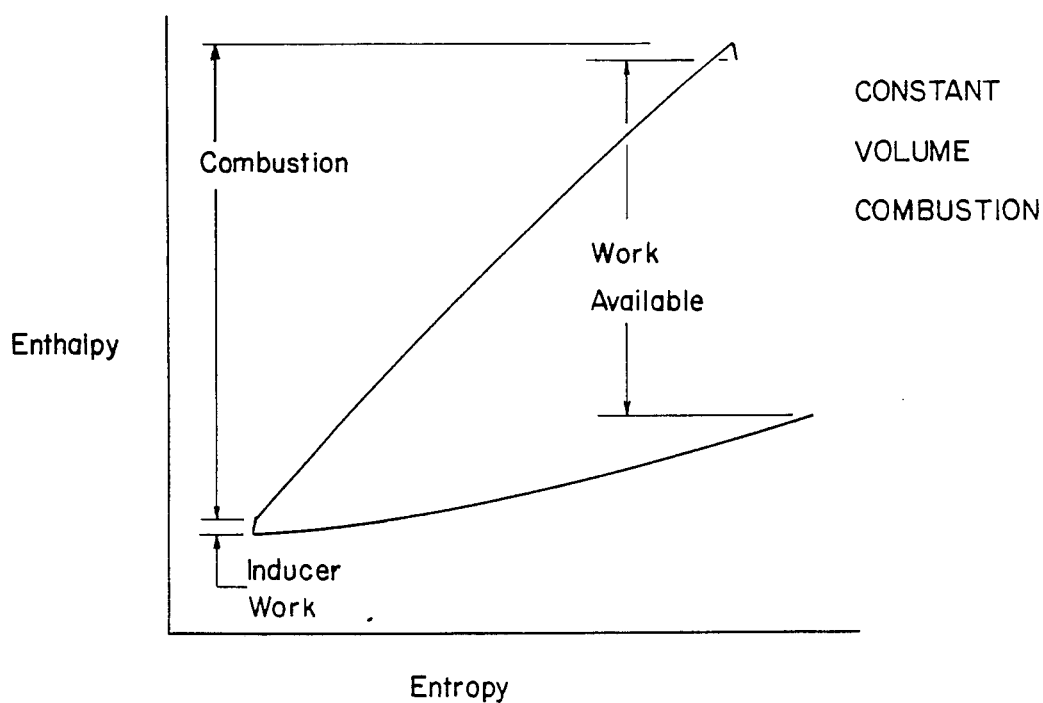
FIG. 11 is an enthalpy/entropy plot of the present constant volume combustion cycle engine.

A further appreciation of the advantages of fixed volume combustion, and the present engine in particular, will be had by reference to FIGS. 10 and 11, which respectively show typical enthalpy-entropy diagrams for a conventional constant pressure, constant flow cycle engine and the present constant volume combustion engine. From FIG. 10 it will be seen that the typical constant pressure combustion cycle is dependent on the compressor energizing the gas stream to a relatively high pressure prior to combustion of fuel. The combustion energy available for work output, is reduced by the energy required to drive the compressor. Thus the theoretical, useful work output is but a fraction of the energy produced by the combustion of fuel.

In contrast, FIG. 11, illustrates that, in the present engine, essentially all of the combustion energy is available as output energy. This is directly attributable to to the fact that the inducer imparts only a minimal level of energy to the gas stream. Fuel combustion then increase energy both in terms of increased temperature and increased pressure, both forms of which are available to produce a work output by driving the turbine 18.

FIG. 11 also illustrates why the present engine may be readily started with a minimum requirement. From FIG. 10 it is seen that a relatively large increment of compressor work is required for steady state combustion. As much as 40% of this energy increment is required for initial ignition conditions. Thus starting energy input is quite large. The inducer of the present engine simply charges air into the combustor chambers with little work input. Also air velocity is not a factor in establishing combustion, or explosive conditions. Thus little energy, and low rotor speeds are required to establish initial ignition conditions. Therefore the present engine may be readily started with a pull rope or a starter motor similar to those used in automobiles and other vehicles. Starting torque may be supplied through the accessories drive shaft 94, as opposed to a separate, direct connector for the main rotor shaft, as is common in many conventional gas turbine engines.

Available output energy is also a function of system losses. This is particularly true in the case of constant volume combustion, where leakage from the combustion chambers will reduce the pressure of the gas stream discharged to the turbine.

As already noted, the inlet and outlet ends of the combustion chambers 62 are sealed, radially by the labyrinth seals 78, 80 and 86, 88 while the ends of the vanes 58 and the surfaces 76, 84 provide the seals between the several chambers 62. All of these seals are dependent on a minimal clearance between the relatively rotating components. In the present case, this would be the axial spacing between the compositely formed inducer/turbine disc and the combustor. With only two components involved, the required minimum clearance is both readily obtained and maintained. The effectiveness of the seals 87,89,91 and 93 are similar enhanced by being coplanar and involving a minimum number of components. Further, with this minimum number of components, the clearance is less affected by thermal growth, which is more pronounced, or more of a problem in maintaining equal, in a radial direction. This is to point out that, when an engine is started up, it is at a relatively low temperature, at which the clearance there is an initial clearance between these sealing surfaces. As the engine is brought up to its operating temperature, the several components will increase in temperature causing thermal growth of these components and a change in the sealing clearances. The described configuration minimizes this change and enables the clearances to be maintained at a minimum and thus greatly reducing energy losses.

Another factor in minimizing such pressure losses is found in the fact that the rotor sealing surface for both the inducer and the turbine, lies in a single plane. This configuration not only enhances the minimum clearances which can be maintained, but facilitates the manufacturing process in that machining can be more accurately done in a single plane.

Attention is also directed to the configuration of the vanes 58. The inlet end portions of these vanes are configured pursuant to the established aerodynamic principles for compressor turning vanes, thus minimizing energy losses as air is charged into the combustion chambers. The outlet end portions of the vanes are then configured pursuant to the established aerodynamic principles for turbine nozzles, thereby minimizing energy losses as the combustion gasses are discharged to drive the turbine 18.

It will also be appreciated that the previously described means for adjusting the angular distance between the inducer port 64 and turbine port 72 minimizes pressure energy losses by minimizing the time at which pressurization of the chamber 62 is maintained at a maximum value.

FIGS. 12-15 illustrate an alternate, axial, through-flow embodiment of the present invention. It similary comprises, an inducer 140, combustor 142 and turbine 144, arranged in series flow relationship, as in other axial flow gas turbine engines. The inducer 140 and the turbine 144 are mounted on a shaft 146 which is journaled by bearings 148, 150, on hubs 152, 154. Hub 152 is supported by struts 156 from an inlet casing 158 and hub 154 is supported by struts 160 from a discharge casing 162. The combustion 142 comprises a plurality of radially extending vanes 164 extending from an outer casing 166 to an inner hub 168. The vanes 164 define a plurality of combustor chamber 165. The casings 158, 166 and 162 are flanged and secured together by bolts, not shown, to give the engine structural integrity.

For purposes which later appear, a accessories drive shaft 170 is connected to the engine shaft 146 through bevel gears 172. The accessories drive shaft 170 is journaled in and passes through an enlarged forward strut 156.

Figure 15:
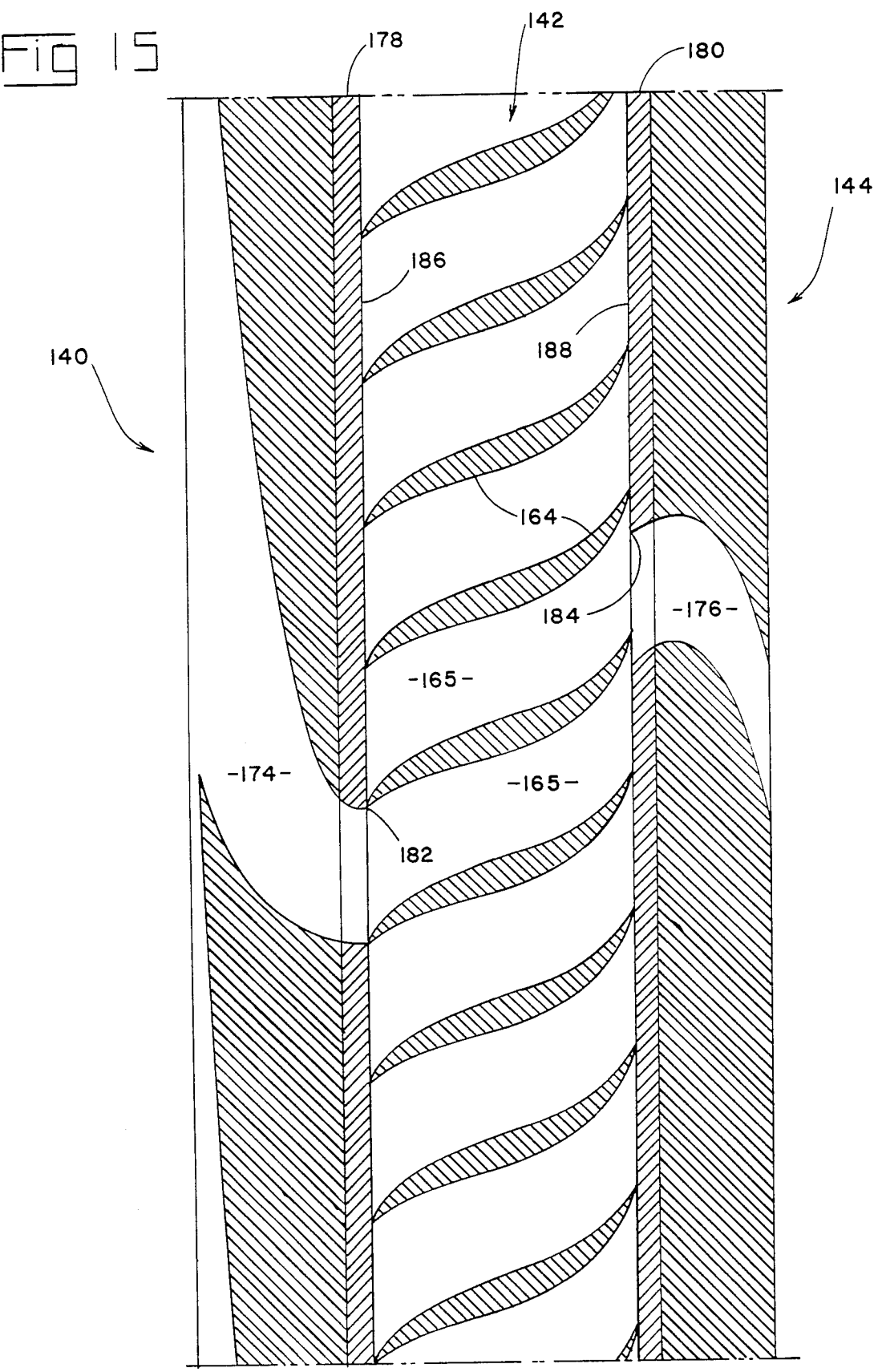
FIG. 15 is a radial development, taken generally on line 15—15 in FIG. 13, illustrating flow though the inducer, combustor and turbine.
Figure 16:
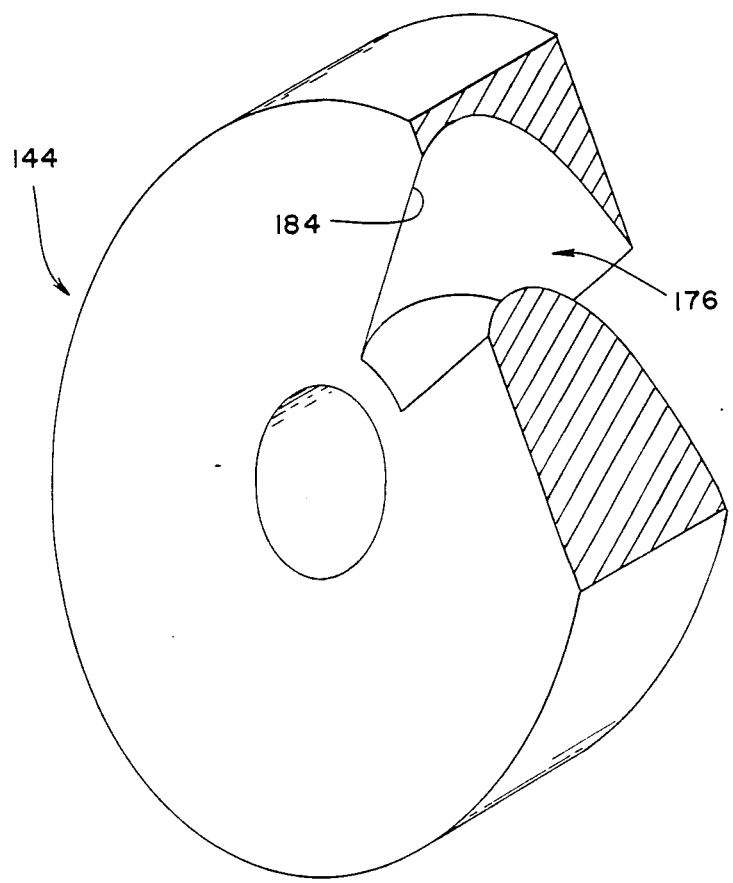
FIG. 16 is a perspective view, partially broken away, of the turbine seen in FIG. 12.

The inducer 140, FIG. 12, has a single passageway 174, and the turbine 144 is similarly formed with a single expansion passageway 176, best illustrated in FIG. 15 and 16. The radial faces of the inducer 140 and turbine 144 adjacent the combustor 142 are surfaced with high temperature material 178 and 180. The discharge port 182 of the inducer passageway 174 opens onto the circumferential, radial face 186 of the sealing material 178 and is in sealing relation with the upstream ends of the vanes 164 which define the entrances to the several chambers 165. The turbine expansion passageway has an inlet port 184 which opens through the surfacing material 180, the circumferential, radial surface 188 of which is in sealing relation with the downstream ends of the vanes 164 which define the combustor chamber exits.

The inner and outer bounds of the gas flow path are sealed by labyrinth seals. Thus seals 190, 192 are provided at the interface between the inducer 140 and the combustor 142 and seals 194, 196 are provided at the interface between the combustor and the turbine 144.

Fuel injectors 198 and spark plug 200 are mounted on the casing 166 for injecting fuel into each of the chambers 165 and then igniting the explosive atmosphere thus created.

The inducer passageway 174 is configured similarly to the passageway of the inducer 14, previously described, to serve the primary purpose of charging air into the chambers 165 at relatively low velocities and pressure levels.

In sustained operation, the inducer successively charges the combustion chambers 165 with air at a moderate level of pressurization. Again, the angular relationship between the inducer opening 182 and the turbine discharge is such that there is an initial scavenging of the chamber and then as rotation continues (the inducer and turbine move upwardly as depicted in FIG. 15), the downstream end of the chamber is closed by the circumferential sealing surface of the turbine and the chamber is charged by air dead headed into it by the inducer 140. Continued rotation then closes off the upstream end of the chamber as the sealing surface 186 of the inducer moves to the relative position shown for chamber 165*a*.

With both ends of the chamber thus sealed, fuel is introduced therein by the injector 198 and then ignited by the spark plug 200 for that chamber. True constant volume combustion is thus successively obtained in the several chambers comprising the combustor 22, as in the previously described embodiment. The discrete volumes of pressurized gas are then successively discharged through the turbine passageway 56.

A mechanical connection is provided from the accessories drive shaft 170 to a fuel/ignition control 202 which meters fuel to the several injectors 66 and current to the spark plugs 68 in proper timed sequence to rotation of the shaft 26. The control 202 may be configured in accordance with the description of the control 96 to provide for successive firing of each of the chambers 165, or firing of alternate, successive chambers.

Figure 14:
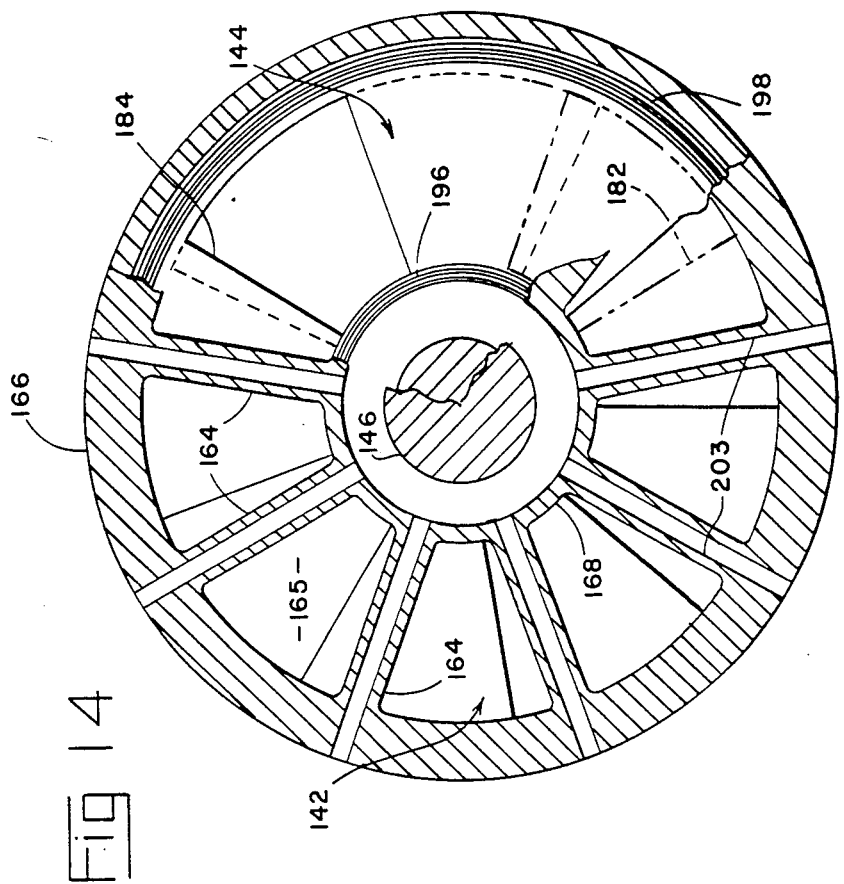
FIG. 14 is a section taken on line 14—14 in FIG. 12.
Figure 13:
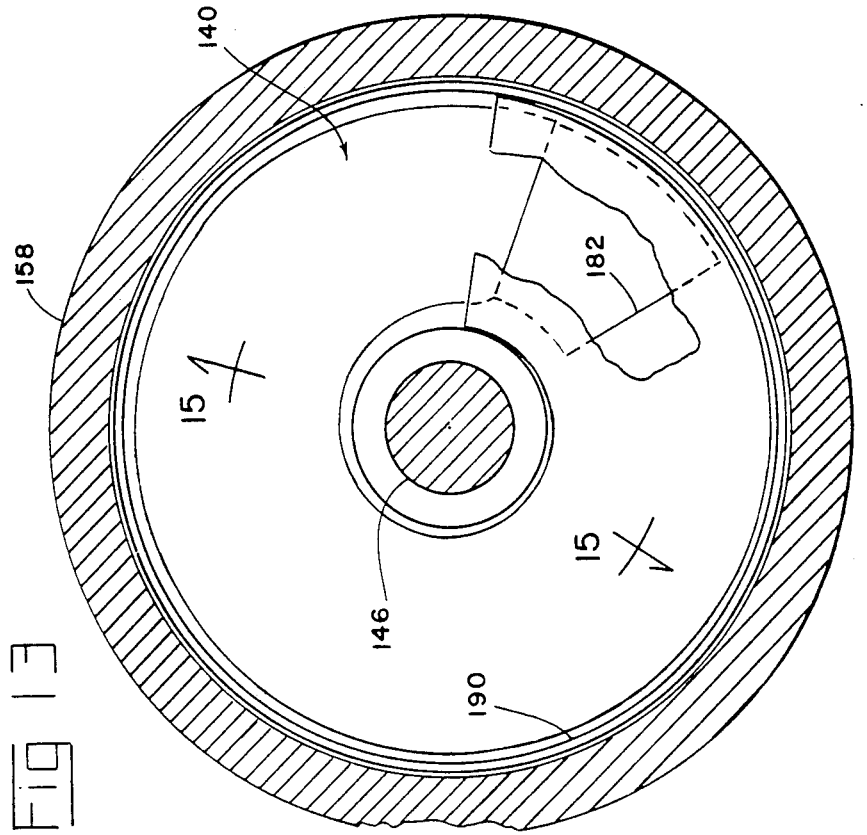
FIG. 13 is a section taken on line 13—13 in FIG. 12.

This embodiment also illustrates the provision of cooling means for the combustor vanes 164. Inducer bleed air, from the labyrinth seal 192 enters the interior of the hub 168 (FIGS. 12 and 14). From there it flows through passageways 203 formed in the vanes 164.

Pursuant to the previous teachings, means could be provided for varying the angular relationship between the inducer 140 and turbine 144 in order to fine tune release of the explosive charge to the turbine. This alternate embodiment incorporates other features previously described. For example, the vanes 164 are particularly adapted to the interrupted flow of the gas stream, with the upstream end portions of thereof being formed as turning vanes, in the same general fashion as stators in a multi-stage, axial flow compressor, thereby maximizing air flow into the combustor chambers 165. The downstream end portions of the vanes 44 are formed pursuant to the general principles defining the configuration of turbine nozzles, thereby optimizing the energy which will be extracted by the turbine and the power output of the engine.

The configuration of the combustion chambers 165 is also significant in that the length of these chamber approximates their widths. This configuration approaches the optimum hemispheric shape for a constant volume combustion chamber, for efficient fuel combustion.

Operationally this embodiment of the invention is essentially the same as previously described. Its enthalpy/entropy diagram of FIG. 11 illustrates its operation. Its ease of starting is the same, with starting torque likewise being capable of being through the accessories drive shaft 170.

Figure 17:
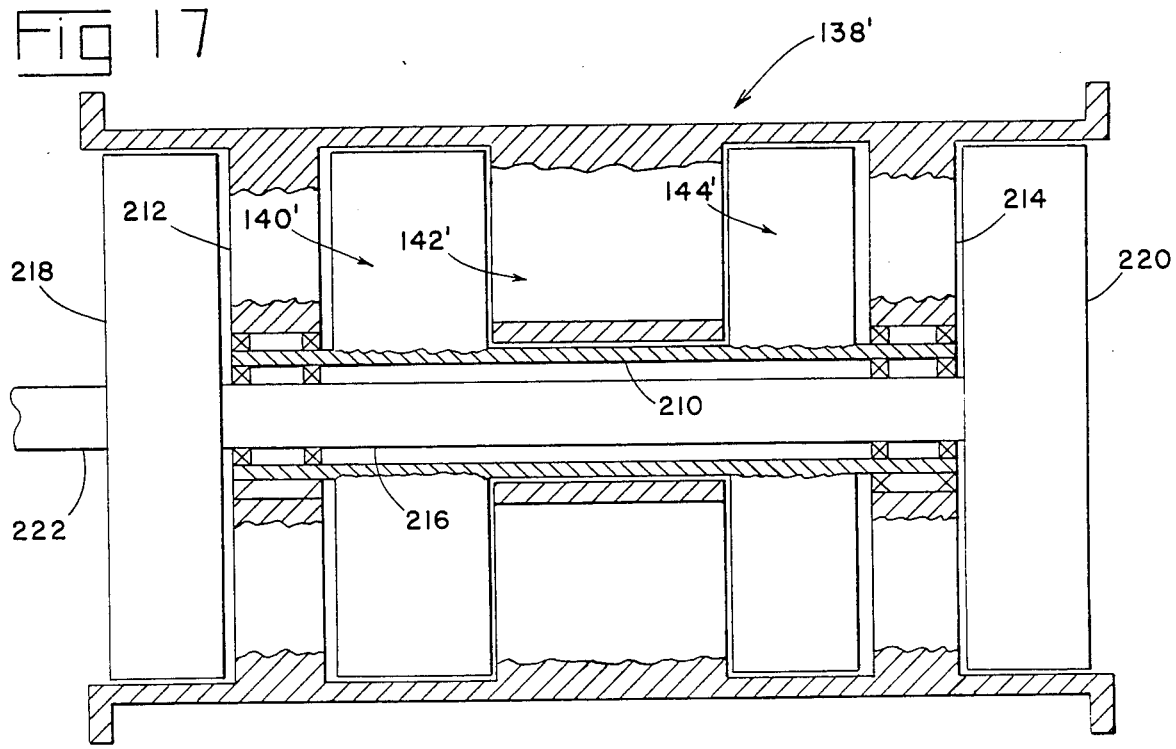
FIG. 17 is a schematic view, in longitudinal section, of another embodiment of the invention.

Referencing FIG. 17, a further embodiment of the invention is illustrated, in schematic fashion. It includes a "core engine" 138', which incorporates the axial, through flow path of the gasses in the same fashion as in the embodiment of FIGS. 12-16. Thus an inducer 140', combuster 142' and turbine 144' are arranged in series flow relation with means provided for firing the chambers of the combustor as previously described.

The inducer 140' and turbine 144' are joined by a hollow shaft 210 which is journaled at its opposite ends on stationary vanes 212, 214. A second shaft 216 is journaled within the shaft 212 and connects a compressor 218 and turbine 220. A power output shaft 222 projects forwardly from the compressor 218.

In this embodiment, the "core engine" 138' functions as a gas generator, with output power being derived from the free turbine 214. A portion of the power generated is also employed to drive the compressor 218 to increase the energy level of the air fed by the inducer 140' to the combustor 142' and the stoichiometric temperature of combustion. The compressor 218 and the turbine 220 are of the full flow type, as opposed to the partial entry inducer and turbine of the "core engine". The vanes 212 are configured as turning vanes to properly direct air from the compressor 218 to the inducer 140'. Similarly the vanes 214 are formed as nozzles to properly direct the hot gas stream discharge from the turbine 144' to the free turbine 220.

The power output shaft may be connected to any suitable load, including a propeller or fan for aircraft propulsion.

The engine of this embodiment has the known advantages of a free turbine engine, combined with the ease of starting attained pursuant to the present invention. Thus, essentially the same, low level of starting torque is required to start the core engine 138', since its operation is independent of the need to obtain an initial pressure rise from the compressor 218.

Many variations of the described embodiments will be apparent to those skilled in the art, within the spirit and scope of the present teachings. Accordingly, the scope of the present inventive concepts is to be derived from and limited, solely by the appended claims.

Having thus described the invention, what is claimed as novel and desired to be secured by Letters Patent of the United States is:

1. A gas turbine engine comprising, in series flow relation, an inducer, a combustor into which air is charged by the inducer and in which hot gases are generated, and a turbine rotatably driven by said hot gases, said inducer and turbine being interconnected so that the inducer is driven by the turbine, said turbine and inducer comprising an engine rotor, said engine rotor being rotatable about a common axis, relative to the combustor, said engine rotor further comprising a power output shaft for delivering rotative power to a device to be driven thereby, said combustor comprising a plurality of circumferentially spaced chambers, each having an entrance and an exit, said inducer having a radial surface in sealing relation with the combustion chamber entrances and an air flow passageway terminating in a discharge port opening onto said radial surface, said turbine having a radial surface in sealing relation with the combustion chamber exits and an expansion passageway having an inlet port opening from said radial surface, said inducer discharge port and said turbine inlet port being successively registerable with the entrances and exits of different combustion chambers, as the inducer and turbine rotate, and as both the entrance and exit of at least one chamber are sealed, and further comprising operating means including means for introducing fuel into said chambers and means for igniting the fuel in successive chambers when both ends are sealed, characterized in that the igniting means ignites the fuel in less than the total number of combustion chambers during each cycle of engine rotor rotation.

2. A gas turbine engine comprising, in series flow relation, an inducer, a combustor into which air is charged by the inducer and in which hot gases are generated. and a turbine rotatably driven by said hot gases, said inducer and turbine being interconnected so that the inducer is driven by the turbine, said turbine and inducer comprising an engine rotor, said engine rotor being rotatable about a common axis, relative to the combustor, said engine rotor further comprising a power output shaft for delivering rotative power to a device to be driven thereby, said combustor comprising a plurality of circumferentially spaced chambers, each having an entrance and an exit, said inducer having a radial surface in sealing relation with the combustion chamber entrances and an air flow passageway terminating in a discharge port opening onto said radial surface, said turbine having a radial surface in sealing relation with the combustion chamber exits and an expansion passageway having an inlet port opening from said radial surface, said inducer discharge port and said turbine inlet port being successively registerable with the entrances and exits of different combustion chambers, as the inducer and turbine rotate, and as both the entrance and exit of at least one chamber are sealed, and further comprising operating means including means for introducing fuel into said chambers and means for igniting the fuel in successive chambers when both ends are sealed, and means, operable during engine operation, for adjusting the angular relation between the inducer discharge port and the turbine inlet port.

3. A gas turbine engine comprising, in series flow relation, an inducer, a combustor into which air is charged by the inducer and in which hot gases are generated. and a turbine rotatably driven by said hot gases, said inducer and turbine being interconnected so that the inducer is driven by the turbine, said turbine and inducer comprising an engine rotor, said engine rotor being rotatable about a common axis, relative to the combustor, said engine rotor further comprising a power output shaft for delivering rotative power to a device to be driven thereby, said combustor comprising a plurality of circumferentially spaced chambers, each having an entrance and an exit, said inducer having a radial surface in sealing relation with the combustion chamber entrances and a single air flow passageway terminating in a discharge port opening onto said radial surface, said discharge port being defined by leading and trailing edges disposed radially of the inducer axis, and characterized in that said inducer passageway is defined by a lip at its inlet end and comprises a pressure surface curving downstream from said lip to a generally axial direction at a radial edge of the discharge port and a suction surface curving on a progressively increasing slope from said lip to a generally axial direction at the other radial edge of the inducer discharge port, said turbine having a radial surface in sealing relation with the combustion chamber exits and an expansion passageway having an inlet port opening from said radial surface, said inducer discharge port and said turbine inlet port being successively registerable with the entrances and exits of different combustion chambers, as the inducer and turbine rotate, and as both the entrance and exit of at least one chamber are sealed, and further comprising operating means including means for introducing fuel into said chambers and means for igniting the fuel in successive chambers when both ends are sealed.

4. A gas turbine engine as in claim 3 wherein the combustor chambers are defined by vanes characterized in that the upstream portions of said vanes are formed as curved turning vanes to direct air towards an axial direction and the downstream portions of the vanes are formed as turbine nozzles curved to direct the combustion gasses tangentially towards the turbine expansion passageway.

5. A gas turbine engine comprising, in series flow relation, an inducer, a combustor into which air is charged by the inducer and in which hot gases are generated, and a turbine rotatably driven by said hot gases, said inducer and turbine being interconnected so that the inducer is driven by the turbine, said turbine and inducer comprising an engine rotor, said engine rotor being rotatable about a common axis, relative to the combustor, said engine rotor further comprising a power output shaft for delivering rotative power to a device to be driven thereby, said combustor comprising a plurality of circumferentially spaced chambers, each having an entrance and an exit, characterized in that the combustion chambers define flow paths curving from an axial direction, radially outwardly to a reverse axial direction for flow of the hot gas through the turbine expansion passageway in a direction opposite to flow through the inducer, said inducer having a radial surface in sealing relation with the combustion chamber entrances and an air flow passageway terminating in a discharge port opening onto said radial surface, said turbine having a radial surface in sealing relation with the combustion chamber exits and an expansion passageway having an inlet port opening from said radial surface, said inducer discharge port and said turbine inlet port being successively registerable with the entrances and exits of different combustion chambers, as the inducer and turbine rotate, and as both the entrance and exit of at least one chamber are sealed, and further comprising operating means including means for introducing fuel into said chambers and means for igniting the fuel in successive chambers when both ends are sealed.

6. A gas turbine engine as in claim 5 further characterized in that the sealing surfaces of the inducer and turbine lie on a common plane normal to the axis of rotation.

7. A gas turbine engine as in claim 6 further comprising labyrinth seals between the inducer and the combustor and between the combustor and the turbine which, respectively seal the inner and outer bounds of the the compressor entrances and exits.

8. A gas turbine engine as in claim 5 further characterized by means, operable during engine operation, for adjusting the angular spacing between the inducer discharge port and the turbine inlet port.

9. A gas turbine engine as in claim 5 wherein the inducer and turbine comprise a composite rotor including an inner disc in which the inducer passage is formed and an outer ring in which the turbine passage is formed and further including means for rotating the ring relative to the inner disc to adjust the angular spacing between the inducer discharge port and the turbine inlet port.

10. A gas turbine engine as in claim 9 wherein the sealing surfaces of the inducer and turbine lie on a common plane normal to the axis of rotation.

11. A gas turbine engine comprising, in series flow relation, an inducer, a combustor into which air is charged by the inducer and in which hot gases are generated. and a turbine rotatably driven by said hot gases, said inducer and turbine being interconnected so that the inducer is driven by the turbine, said turbine and inducer comprising an engine rotor, said engine rotor being rotatable about a common axis, relative to the combustor, said engine rotor further comprising a power output shaft for delivering rotative power to a device to be driven thereby, said combustor comprising a plurality of circumferentially spaced chambers, each having an entrance and an exit, said inducer having a radial surface in sealing relation with the combustion chamber entrances and an air flow passageway terminating in a discharge port opening onto said radial surface, said turbine having a radial surface in sealing relation with the combustion chamber exits and an expansion passageway having an inlet port opening from said radial surface, said inducer discharge port and said turbine inlet port being successively registerable with the entrances and exits of different combustion chambers, as the inducer and turbine rotate, and as both the entrance and exit of at least one chamber are sealed, and further comprising operating means including means for introducing fuel into said chambers and means for igniting the fuel in successive chambers when both ends are sealed, characterized in that the combustor comprises an odd number of chambers and the operating means comprises means for igniting the fuel in successive, alternate chambers.

12. A gas turbine engine comprising, in series flow relation, an inducer, a combustor into which air is charged by the inducer and in which hot gases are generated, and a turbine rotatably driven by said hot gases, said inducer and turbine being interconnected so that the inducer is driven by the turbine, said turbine and inducer comprising an engine rotor, said engine rotor being rotatable about a common axis, relative to the combustor, said engine rotor further comprising a power output shaft for delivering rotative power to a device to be driven thereby, said combustor comprising a plurality of circumferentially spaced chambers, each having an entrance and an exit, said inducer having a radial surface in sealing relation with the combustion chamber entrances and an air flow passageway terminating in a discharge port opening onto said radial surface, said turbine having a radial surface in sealing relation with the combustion chamber exits and an expansion passageway having an inlet port opening from said radial surface, said inducer discharge port and said turbine inlet port being successively registerable with the entrances and exits of different combustion chambers, as the inducer and turbine rotate, and as both the entrance and exit of at least one chamber are sealed, and further comprising operating means including means for introducing fuel into said chambers and means for igniting the fuel in successive chambers when both ends are sealed, characterized in that the combustor comprises an odd number of chambers and the operating means comprises means for introducing fuel directly into successive alternate chambers and then igniting the fuel so introduced.

13. A gas turbine engine as in claim 12 wherein the combustor has at least five chambers.

14. A gas turbine engine as in claim 11 further comprising means for adjusting the angular relationship between the inducer discharge port and the turbine inlet port.

* * * * *